(12) United States Patent
Hiratuka et al.

(10) Patent No.: US 6,253,996 B1
(45) Date of Patent: Jul. 3, 2001

(54) MEDIUM HANDLING APPARATUS

(75) Inventors: Shuuiti Hiratuka; Ryuji Ishii, both of Takasaki; Sadao Sone, Tokyo, all of (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/097,656

(22) Filed: Jun. 16, 1998

(30) Foreign Application Priority Data

Jun. 20, 1997 (JP) .................................................. 9-163662

(51) Int. Cl.$^7$ ...................................................... G06F 17/00
(52) U.S. Cl. ............................ 235/375; 235/442; 271/902
(58) Field of Search .................... 271/902, 184, 271/225, 188; 235/442, 444, 445, 480, 375, 475, 486; 242/615; 226/196.1; 493/409–416, 422, 459

(56) References Cited

U.S. PATENT DOCUMENTS

| | | | |
|---|---|---|---|
| 2,494,376 | * | 1/1950 | Coon .................................. 242/55.2 |
| 3,342,390 | * | 9/1967 | Winterbottom et al. .............. 226/45 |
| 3,552,668 | * | 1/1971 | Kanno .................................. 242/55 |
| 3,784,188 | * | 1/1974 | De Ligt ................................ 270/79 |
| 3,806,574 | * | 4/1974 | Arvidson ............................. 264/160 |
| 3,927,874 | * | 12/1975 | Buisman ............................ 270/61 F |
| 4,082,294 | * | 4/1978 | Myers et al. .......................... 274/47 |
| 4,320,960 | * | 3/1982 | Ward et al. ........................ 355/14 R |
| 5,074,836 | * | 12/1991 | Fechner et al. ..................... 493/411 |
| 5,074,837 | * | 12/1991 | Blanton, III et al. ................ 493/412 |
| 5,165,044 | * | 11/1992 | Eschweiler, Jr. et al. ........... 235/475 |
| 5,237,381 | * | 8/1993 | Hamada .............................. 355/321 |
| 5,242,366 | * | 9/1993 | Kita .................................... 493/320 |
| 5,248,291 | * | 9/1993 | DeNoon et al. ..................... 493/410 |
| 5,350,246 | * | 9/1994 | Sehringer .......................... 400/613.2 |
| 5,481,352 | * | 1/1996 | Yamamoto et al. .................. 355/308 |
| 5,533,821 | * | 7/1996 | Awai et al. .......................... 400/619 |
| 5,563,394 | * | 10/1996 | Kako et al. ......................... 235/379 |
| 5,644,380 | * | 7/1997 | Jessen et al. ......................... 355/50 |
| 5,672,018 | * | 9/1997 | Yamamoto et al. ............... 400/613.3 |
| 5,684,285 | * | 11/1997 | Faes et al. ........................... 235/449 |
| 5,717,836 | * | 2/1998 | Horie .................................. 395/101 |
| 5,947,467 | * | 9/1999 | Billings et al. ...................... 271/188 |
| 6,067,775 | * | 5/2000 | O'Connor ............................ 53/429 |
| 6,071,223 | * | 6/2000 | Reider et al. ....................... 493/410 |

FOREIGN PATENT DOCUMENTS

| | | | |
|---|---|---|---|
| 0 848 352 | * | 6/1998 | (EP) . |
| 59-83847 | * | 6/1984 | (JP) . |
| 03113587A | * | 5/1991 | (JP) . |
| 06333109 | * | 12/1994 | (JP) . |
| PCT/JP96-02423 | | 3/1997 | (WO) . |

\* cited by examiner

*Primary Examiner*—Karl D. Frech
*Assistant Examiner*—J. Yven
(74) *Attorney, Agent, or Firm*—Venable; Robert J. Frank

(57) ABSTRACT

A medium handling apparatus for conveying a continuous elongated ticket sheet formed of a plurality of tickets extending along a length of the ticket sheet. Each of the tickets has a given width extending transverse to the length of the ticket sheet and is connected to a contiguous ticket by a line of perforations. The apparatus includes a hopper accommodating the ticket sheet folded along the lines of perforations separating the tickets, feed rollers for conveying the ticket sheet, a feed guide interposed between the hopper and the feed rollers, and a load member attached to the feed guide facing a surface of the ticket sheet. The load member introduces a frictional resistance between the ticket sheet and the load member as the ticket sheet is conveyed to the feed rollers.

17 Claims, 18 Drawing Sheets

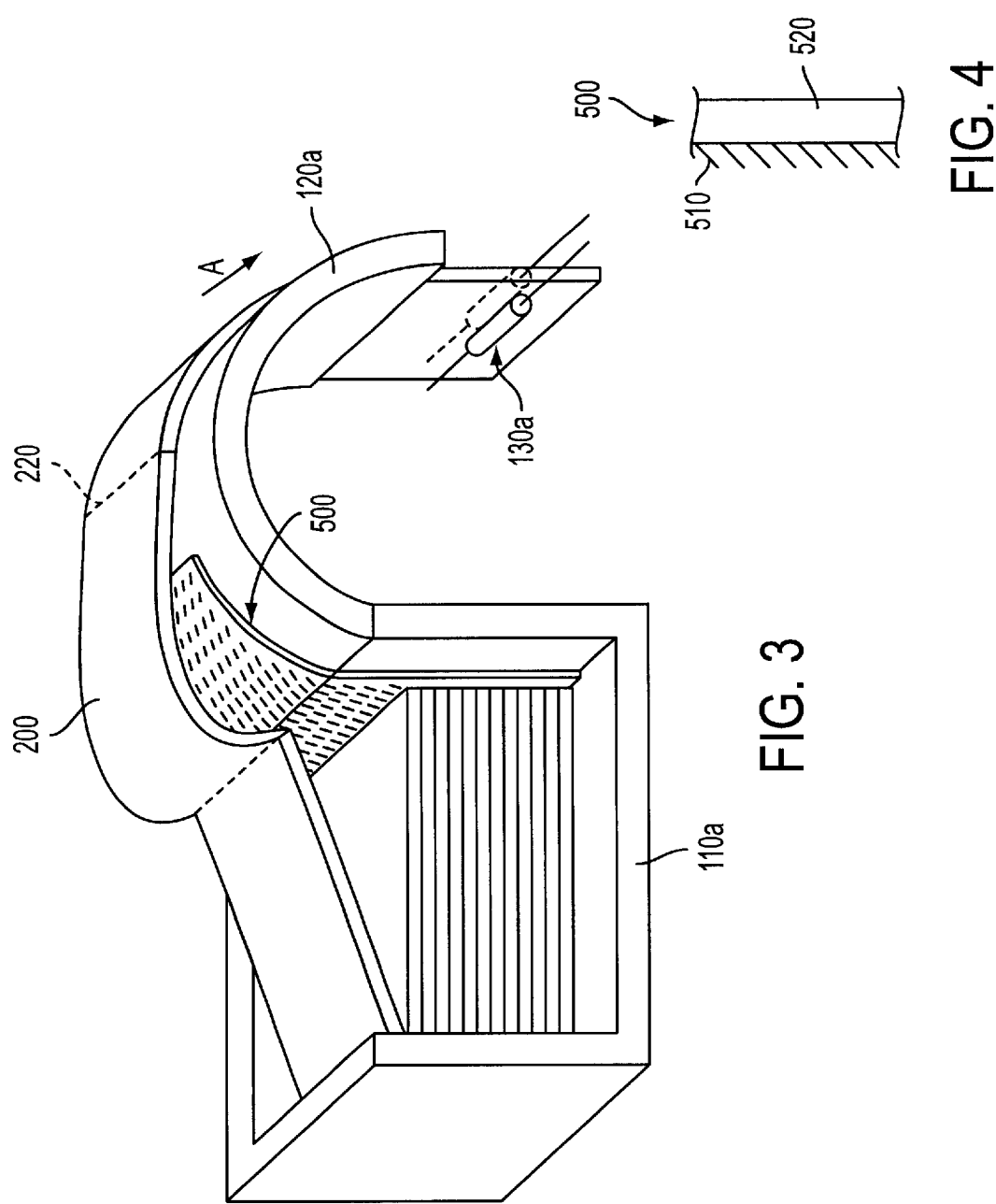

MEDIUM HANDLING APPARATUS

BACKGROUND OF THE INVENTION

The present invention relates to a medium handling apparatus for issuing a ticket of the type used to identify a person entitled to board a plane, ship or train. More particularly, it relates to a medium handling apparatus having a hopper assembly which includes a hopper for accommodating therein a continuous elongated ticket sheet folded along lines of perforations.

Referring to FIG. 7, there is shown a prior art medium handling apparatus 100 having first and second hoppers 110a and 110b. Each of these hoppers accommodates therein a continuous medium which may for example be a continuous elongated ticket sheet 200 consisting of a plurality of tickets 210 connected to each other by lines of perforations 220 (FIG. 8). Ticket sheet 200 is folded along the lines of perforations 220 and stored in hoppers 110a and 110b. The ticket sheet 200 stored in hopper 110a is drawn out of this hopper and, guided by feed guide 120a, inserted between feed rollers 130a. The ticket sheet 200 stored in hopper 110b is drawn out of this hopper and, guided by feed guide 120b, inserted between feed rollers 130b.

When the apparatus 100 issues a ticket 210, a ticket sheet 200 is conveyed from a selected one of the hoppers 110a or 110b to a cutting roller 150 by either feed rollers 130a or 130b depending upon whether hopper 110a or 110b has been selected. The cutting roller 150 cuts the perforation 220 of the ticket sheet 200 after the leading edge of the ticket sheet is detected by either sensor 140a or 140b, again depending upon whether hopper 110a or 110b has been selected, thereby separating the leading ticket from the ticket sheet 200.

The separated ticket 210 is then conveyed to a magnetic processing unit 160 by feed rollers 130c and data describing the ticket, which was previously stored in a magnetic stripe (not shown) of the ticket sheet 200, is read out by a magnetic reading head 161 of the magnetic processing unit 160. Next, data relating to the type of ticket to be issued is written into the magnetic stripe by a magnetic writing head 162 and the ticket 210 is convoyed to a printing unit 170. Additional information is printed on the ticket 210 by a thermal head 171 of the printing part 170 and the ticket 210 discharged to a stacker 180.

FIG. 8 illustrates an example of a prior art hopper assembly consisting of a hopper 110a, a feed guide 120a and feed rollers 130a for use in the medium handling apparatus of FIG. 7. The hopper assembly consisting of hopper 110a, feed guide 120a and feed rollers 130a has arbitrarily been selected for description although the hopper assembly consisting of hopper 130b, feed guide 120b and feed rollers 130b could have been used in this example.

In use, the top and one side of the hopper 110a are opened by an operator and a ticket sheet 200 placed in the hopper. The leading edge of the ticket sheet is fed by the operator over the feed guide 120a and between feed rollers 130a. When instructions to issue a ticket 210 are input to the apparatus 100, the leading edge of the ticket sheet 200 is conveyed toward the cutting roller 150 by the feed rollers 130a.

Another example of a prior art hopper is shown in FIG. 9, again with reference to hopper 110a although the following description would also apply to hopper 110b. This type of hopper is used when there is a limited amount of space above the hopper due to a need to minimize the size of the apparatus 100. In this embodiment, a cover 111 having a position restraint portion 112 is provided over the hopper 110a The position restraint portion 112 slopes upward toward a feed opening 113 and functions to restrain the ticket sheet 200 from floating out of the hopper 110a. In use, one of the four sides of the hopper 110a is opened by the operator and the ticket sheet 200 installed in the hopper from the opened side.

In the initial operation of the hopper assembly of FIG. 9, the leading edge of the ticket sheet is fed over the feed guide 120a and between feed rollers 130a in the direction of the arrow A. When the leading edge of the ticket sheet 200 reaches the sensor 140a, the sensor generates a signal which causes the feed rollers 130a to continue to rotate for a predetermined period of time resulting in the leading edge of the ticket sheet reaching the point B downstream from the sensor 140a Rotation of the feed rollers 130a is then stopped. Next, the feed rollers 130a are driven in reverse for another predetermined period of time which conveys the leading edge of the ticket sheet 200 from the location B through the distance L to a location C between the feed rollers 130a and the sensor 140a. A similar arrangement is used in the prior art hopper assembly shown in FIG. 8 although it is not shown in FIG. 8.

The described feed arrangement is necessary regardless of whether the prior art hopper of FIG. 8 or FIG. 9 is used because the apparatus 100 shown in FIG. 7 selects one of the two hoppers 110a and 110b according to the kind of ticket selected. Therefore, when the hopper from which the ticket sheet is taken is switched to the other hopper, the leading edge of the ticket sheet 200 located at the cutting roller 150 after the ticket 210 has been issued must be returned to the location C between the feed rollers and the sensor. When instructions to issue a ticket 210 are input to the apparatus 100, the leading edge of the ticket sheet 200 is conveyed toward the cutting roller 150 by the feed rollers 130a.

A problem encountered with the prior art apparatus, whether the hopper of FIG. 8 or FIG. 9 is used, is that a feed jam may occur if folded tickets 210 of ticket sheet 200 are drawn out of the hopper when they are clinging to each other by the properties of the ink used for printing the tickets and/or by the presence of static electricity.

Another problem, which is peculiar to the prior art hopper of FIG. 9, is that when the ticket sheet 200 is conveyed in the reverse direction, that is, in the direction opposed to the direction of arrow A, the ticket sheet 200 collides with the position restraint portion 112 of the cover 111 and is pressed hard against it. As a result, the ticket sheet 200 is sometimes improperly cut along a line of perforations 220.

SUMMARY OF THE INVENTION

Accordingly, it is an object of the present invention to prevent a feed jam by providing an apparatus wherein the folded tickets of the ticket sheets do not cling together.

Another object of the invention is to provide an apparatus wherein stress is not applied to the perforations in the ticket sheet when the ticket sheet is conveyed in the reverse direction.

The present invention is a medium handling apparatus for conveying a continuous elongated ticket sheet formed of a plurality of tickets extending along a length of the ticket sheet. Each of the tickets has a given width extending transverse to the length of the ticket sheet and is connected to a continuous ticket by a line of perforations. The apparatus includes a hopper accommodating the ticket sheet folded along the lines of perforations separating the tickets, feed rollers for conveying the ticket sheet, a feed guide interposed between the hopper and the feed rollers, and a load member attached to the feed guide facing a surface of the ticket sheet. The load member introduces a frictional resistance between the ticket sheet and the feed guide as the ticket sheet is conveyed in a first direction to the feed rollers.

In another embodiment of the invention, a sensor spaced in the first direction from the feed rollers is provided. The sensor detects the position of the leading edge of the ticket sheet and drives the feed rollers in either the first direction or a second direction opposite the first direction. A cover assembly is attached to an upper portion of the hopper for producing a curve in the ticket sheet as it is drawn from the hopper to the feed rollers.

BRIEF DESCRIPTION OF THE DRAWINGS

The present invention is illustrated in the drawings in which:

FIGS. 2 and 3 show partial diagramatic perspective views of modifications of the hopper assembly of FIG. 1;

FIG. 4 is an enlarged view of a portion of the hopper assembly of FIG. 3;

DETAILED DESCRIPTION OF THE PREFERRED EMBODIMENTS

Figure 5:
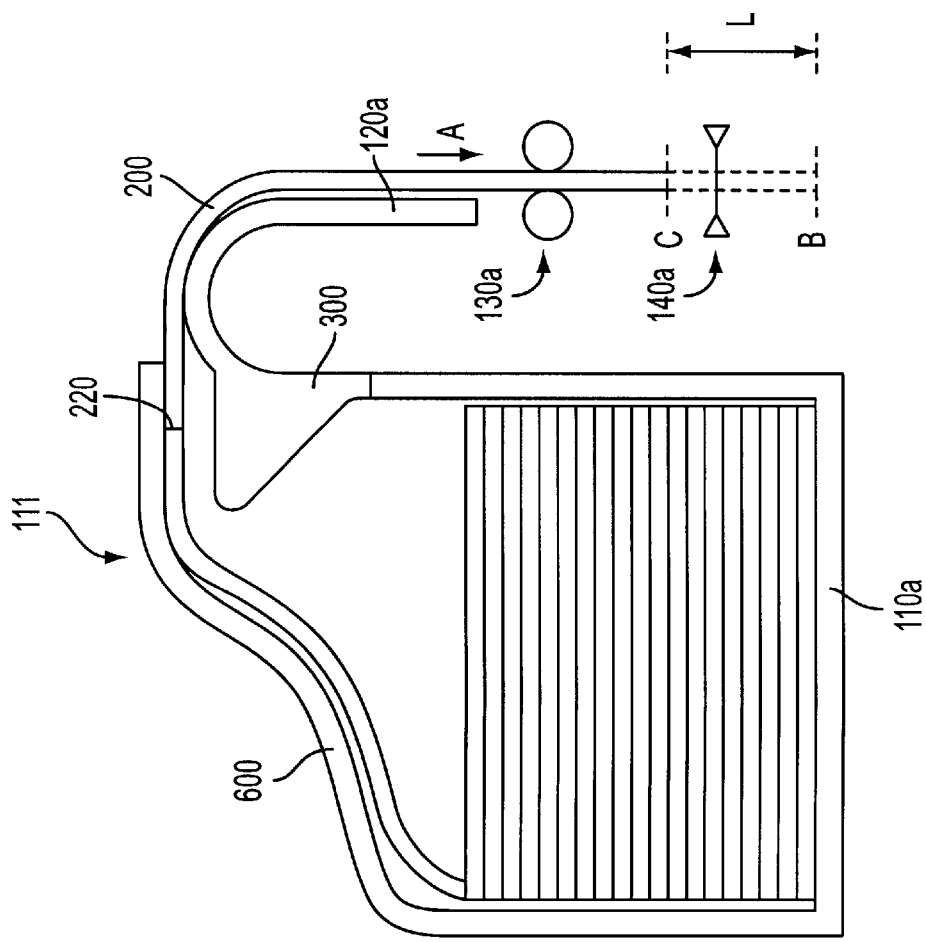
FIGS. 5–5E are partial diagrammatic perspective views of a second embodiment of the hopper assembly of the present invention showing successive stages of withdrawal of a ticket sheet from a hopper.
Figure 5E:
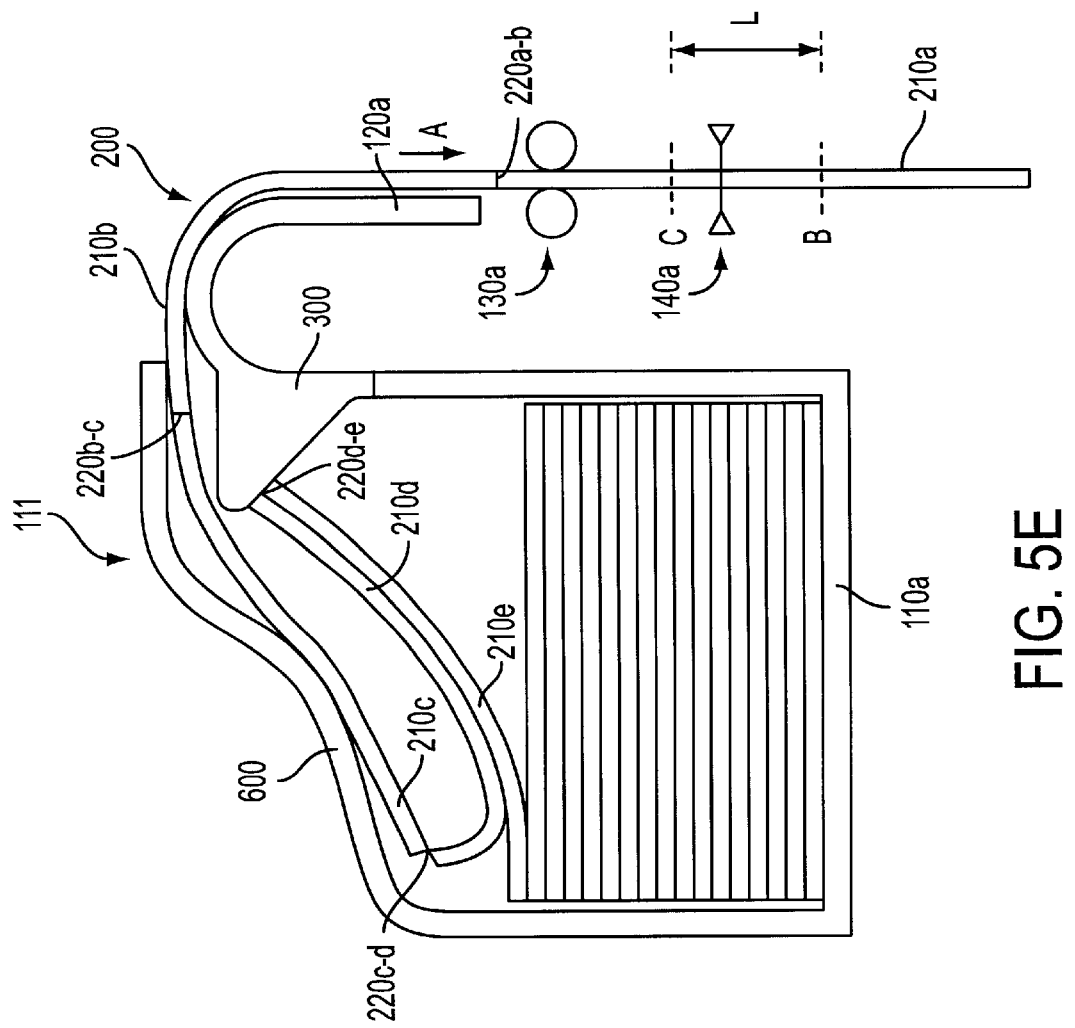
Figure 6A:
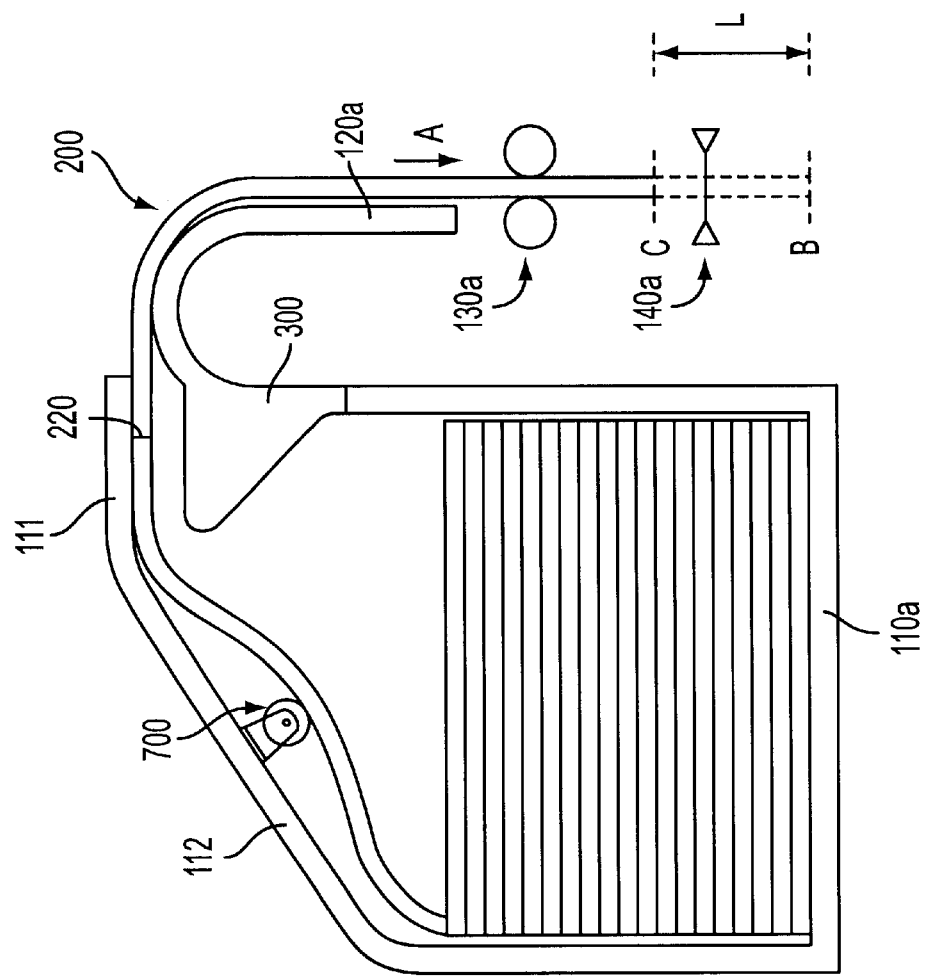
FIGS. 6A and 6B are partial diagrammatic perspective views of a modification of the hopper assembly of FIG. 5.
Figure 6B:
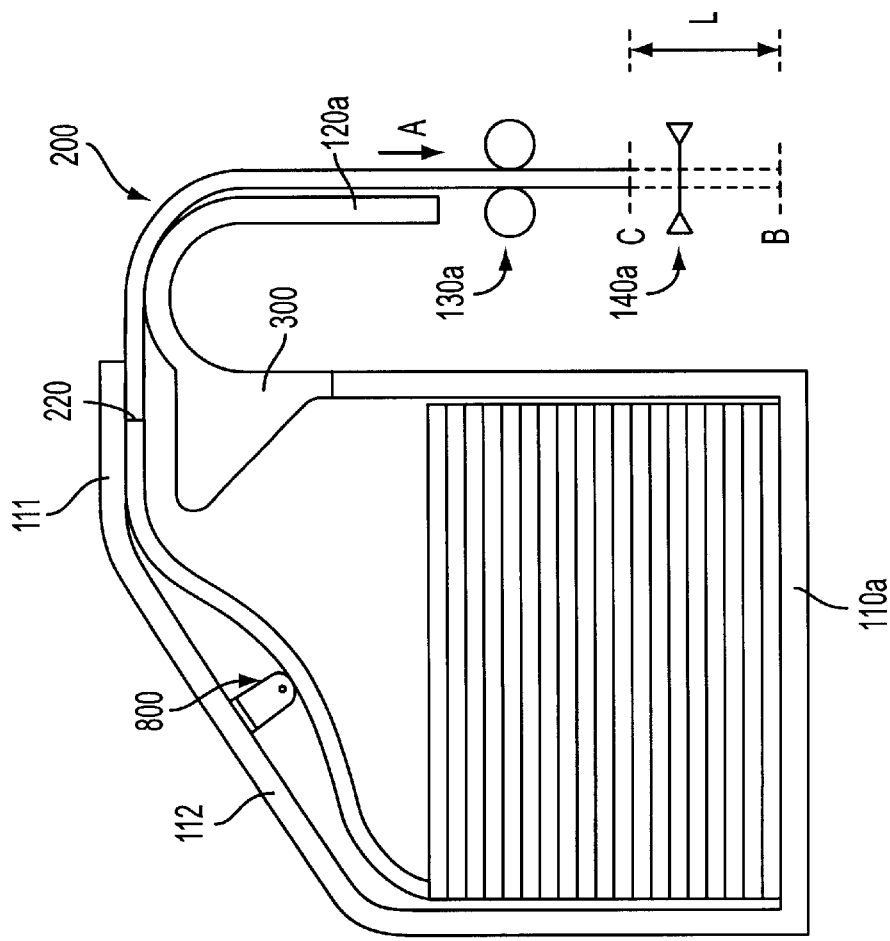
Figure 7:
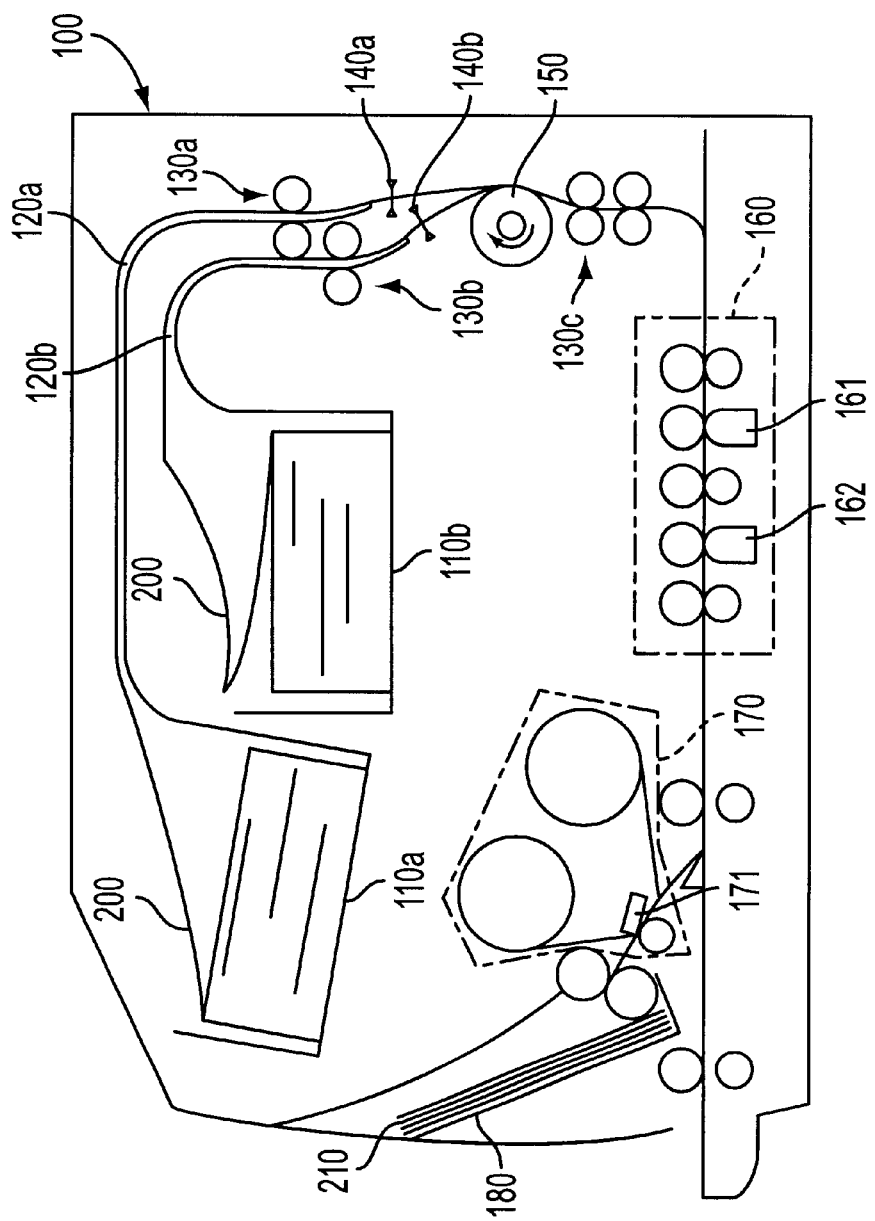
FIG. 7 is a schematic illustration of a medium handling apparatus of the prior art which is also applicable to the present invention.

FIGS. 1–1D, 2–4, 5–5E, 6A and 6B depict hopper assemblies of the present invention which are suitable for use in the prior art medium handling apparatus of FIG. 7. As described above, FIG. 7 shows two hopper assemblies, the first assembly consisting of hopper 110a, feed guide 120a and feed roller 130a and the second assembly consisting of hopper 110b, feed guide 120b and feed roller 130b. It will be understood that the hoppers illustrated in FIGS. 1–1D, 2–4; 5–5E, 6A and 6B could be either of the two hopper assemblies shown in FIG. 7. However, for ease of description, the embodiments of this invention will be described only in connection with the first hopper assembly consisting of hopper 110a, feed guide 120a and feed rollers 130a Also, in FIGS. 1–1D, 2–4, 5–5E, 6A and 6B corresponding parts are identified by the same numbers.

Figure 1:
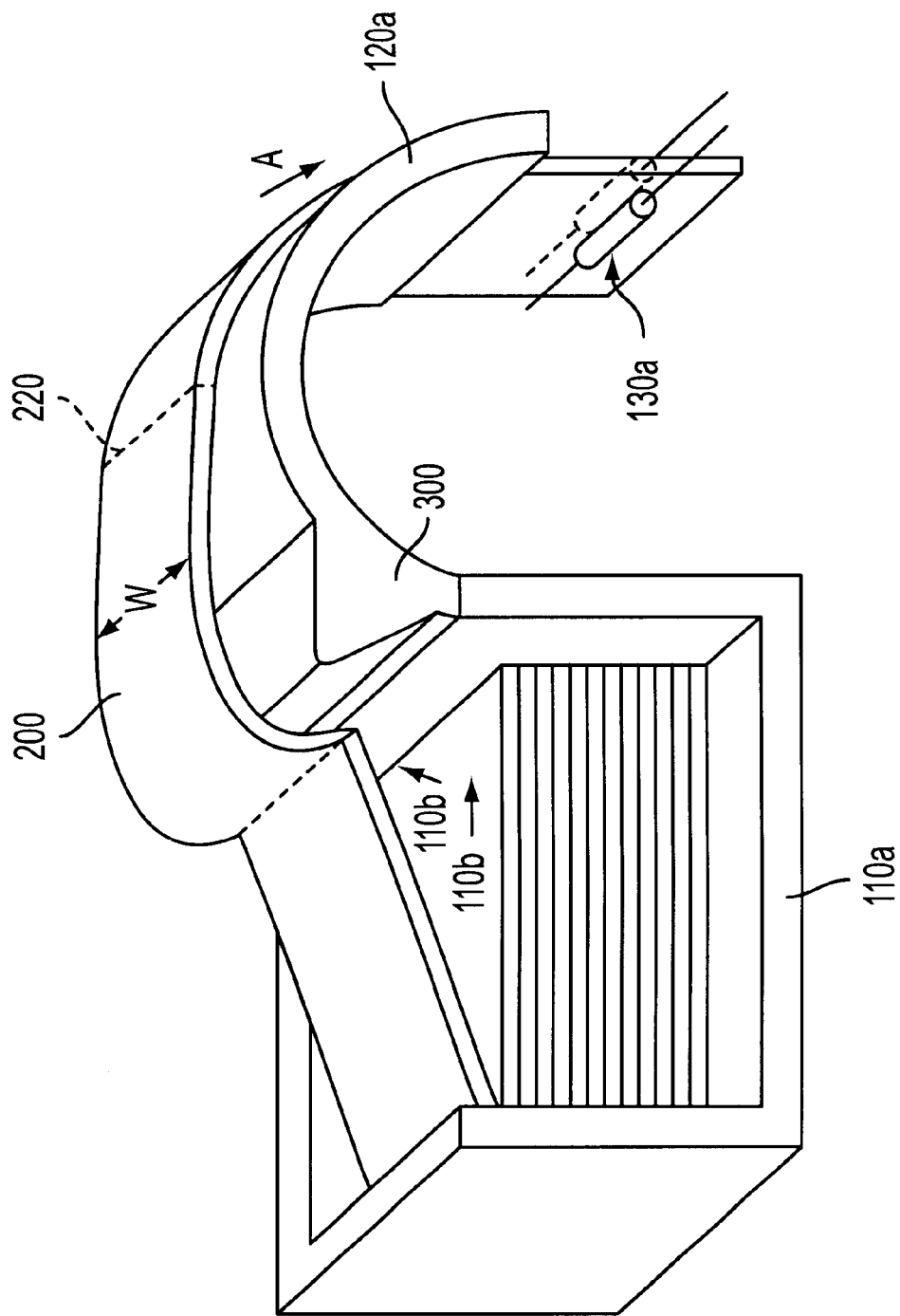
FIGS. 1–1D are partial diagrammatic perspective views of a first embodiment of a hopper assembly of the present invention showing successive stages of withdrawal of a ticket sheet from a hopper.
Figure 8:
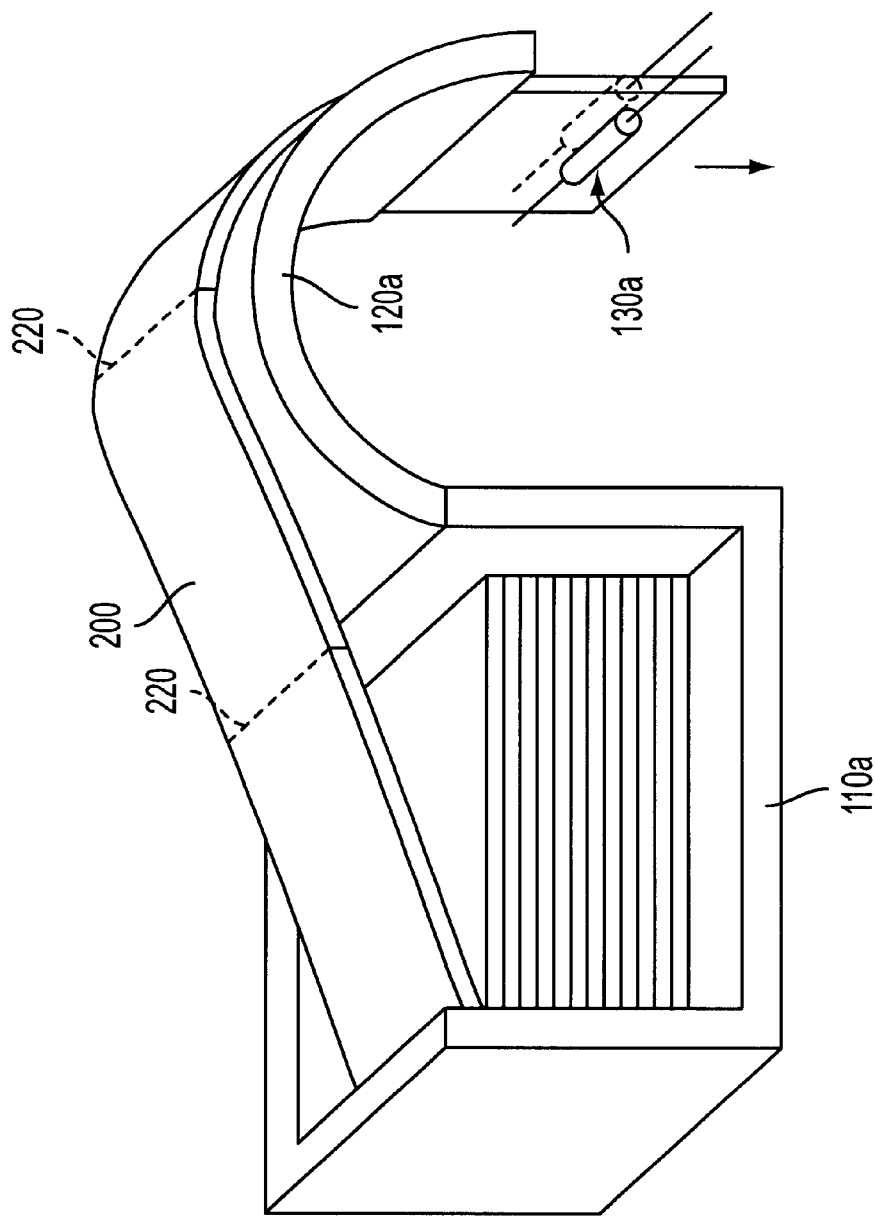
FIGS. 8 and 9 are partial diagrammatic perspective views of prior art hopper assemblies used in the medium handling apparatus of FIG. 7.

FIG. 1 illustrates a hopper assembly of this invention which differs from the prior art hopper of FIG. 8 in that the feed guide 120a is provided with a load member or projection 300 having a width which is one-half or greater than the width W of the ticket sheet 200. As shown in FIG. 1, projection 300 extends into the path of the ticket sheet 200 which causes the sheet to curve outward as it is withdrawn from hopper 110a and slid over the projection by feed rollers 130a. The projection 300 applies a frictional load to the ticket sheet thereby introducing a resistive force between the ticket sheet 200 and the projection 300 as the ticket sheet rubs along the projection.

The effect of the projection 300 is illustrated in FIGS. 1A–1D wherein the leading ticket of the ticket sheet 200 is labeled 210a, the next four tickets are labeled 210b, 210c, 210d and 210e, and the perforations between tickets 210a and 210b are designated 220a–b, between tickets 210b and 210c are designated 220b–c, between tickets 210c and 210d are designated 220c–d, and between tickets 210d and 210e are designated 220d–e.

Figure 1A:
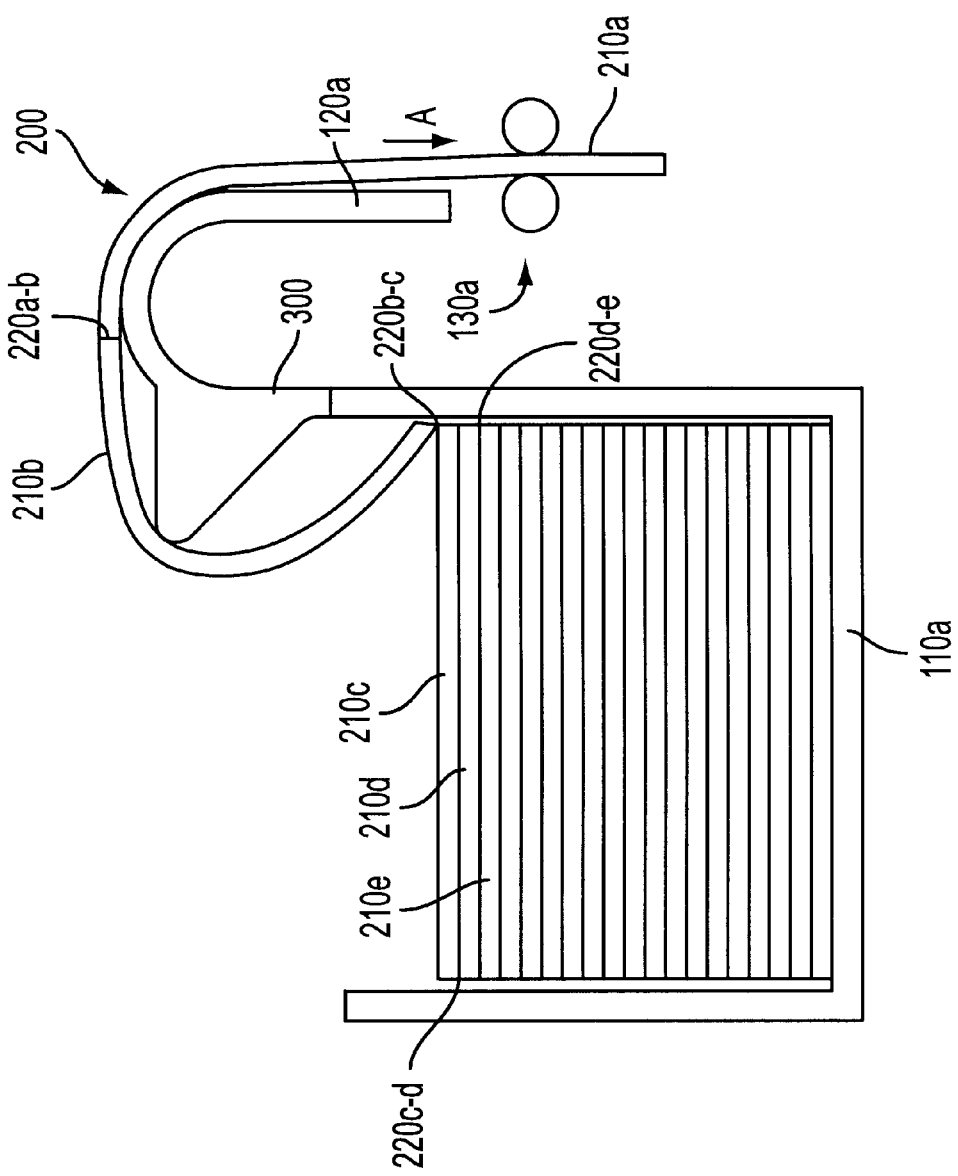

As indicated in FIG. 1A, when the leading edge of ticket 210a is being conveyed to the cutting roller 150 (FIG. 7), the subsequent ticket 210b is being slid over the projection 300, and the following tickets 210c–210e lie flat in the hopper 110a.

Figure 1B:
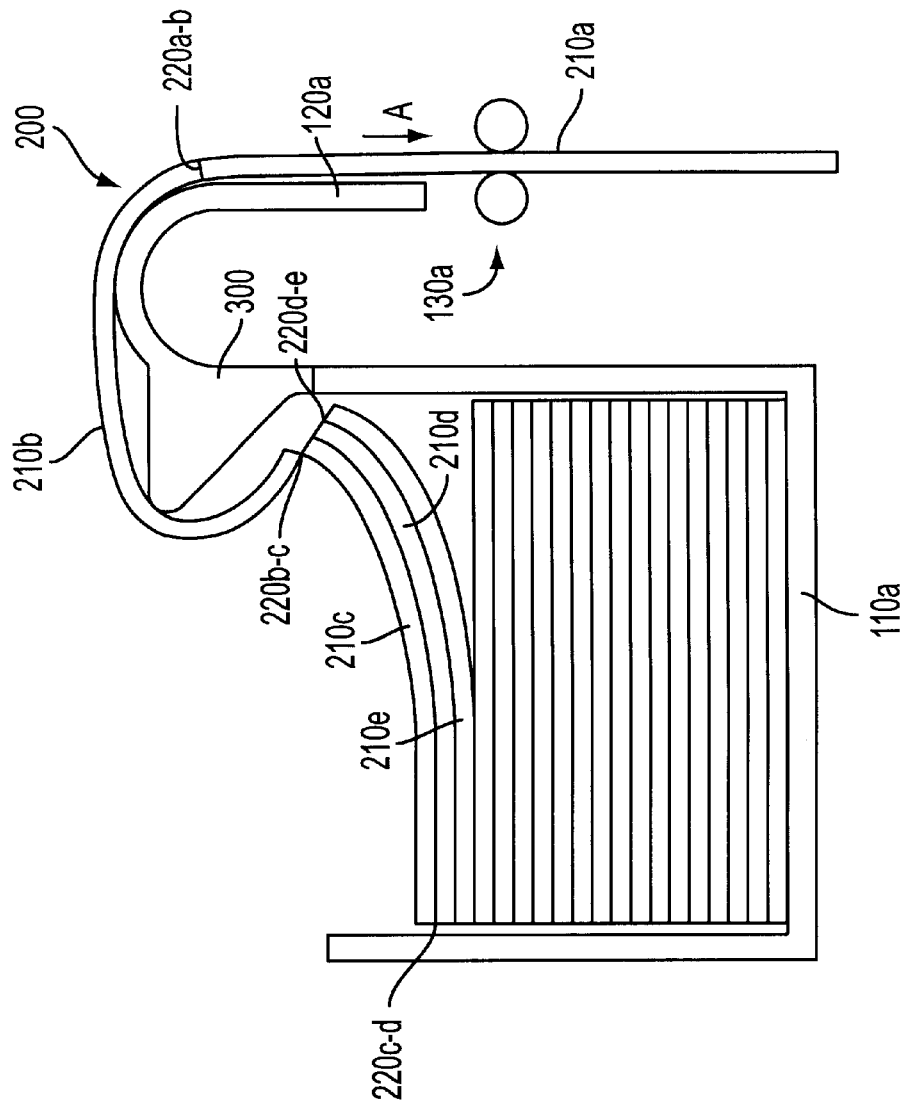
Figure 1C:
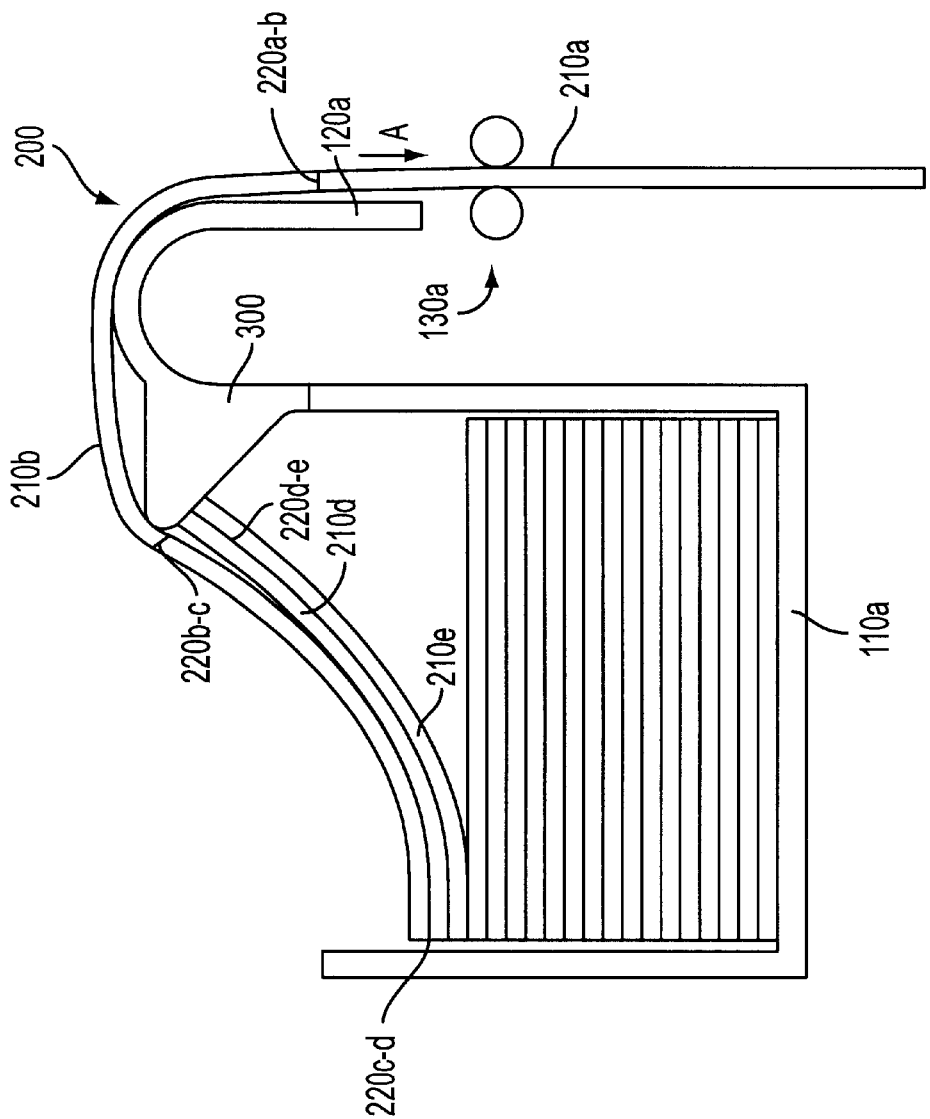
Figure 1D:
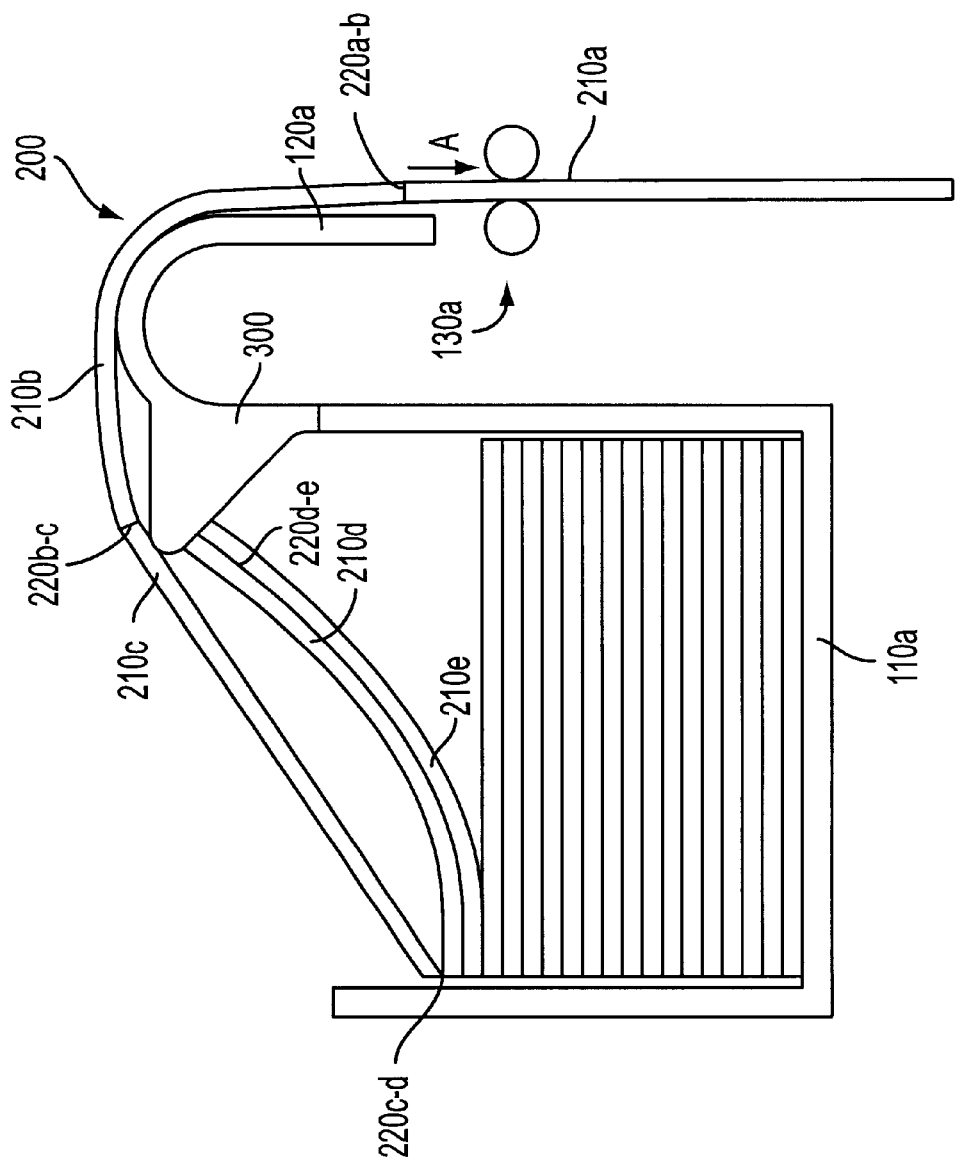

Referring to FIG. 1B, the situation is shown in which, as the ticket sheet 200 is further withdrawn from the hopper 110a, ticket 210c adheres to ticket 210d due to an electrostatic charge on the tickets and/or because the ink on the tickets causes them to stick to each other. Consequently, the perforations 220d–e separating tickets 210d and 210e strike the projection 300 thereby restraining the ticket sheet 200 from moving forward in the direction of arrow A, as shown in FIG. 1C. As a result, as shown in FIG. 1D, ticket 210c is separated from ticket 210d.

Therefore, when an instruction is input to the medium handling apparatus 100 to issue a ticket 210 and the leading edge of the ticket sheet 200 is conveyed to the cutting roller 150 (FIG. 7) by the feed rollers 130a, the ticket sheet 200 drawn out of the hopper 110 is placed in frictional contact with the projection 300. It has been found that, when the hopper assembly of FIG. 1 is used in the medium handling apparatus of FIG. 7, the tickets 210 of the folded ticket sheet 200 do not cling to each other, the ticket sheet 200 is conveyed smoothly by the feed rollers, and feed jams do not occur.

Figure 2:
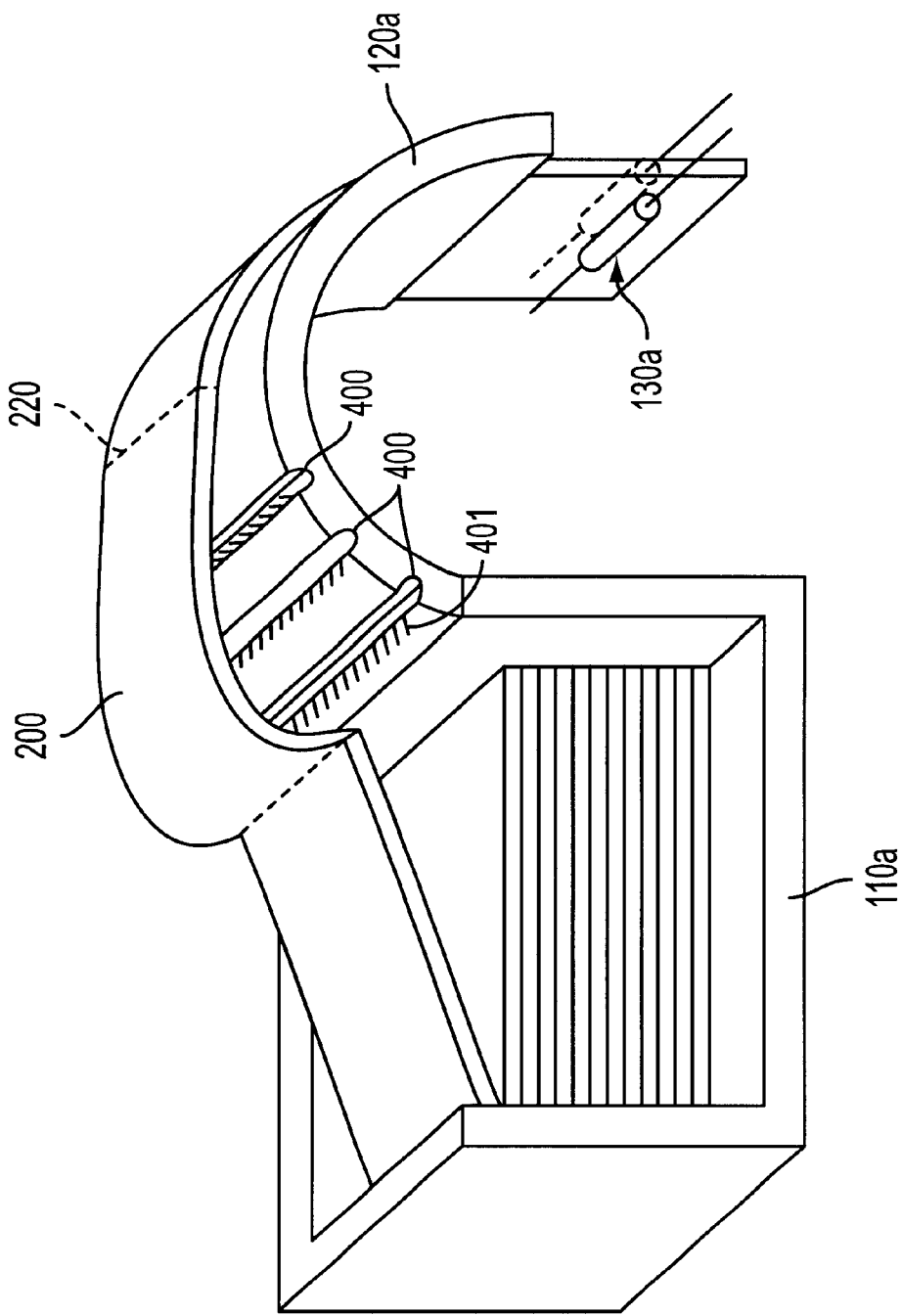

FIG. 2 shows a modification of the hopper assembly of FIG. 1 wherein electrostatic charge removal bars 400 are provided in place of the projection 300. The bars 400 consist of acrylic plated with copper. As in the case of the projection 300, the charge removal bars 400 extend into the path of the ticket sheet 200 which causes the sheet to curve outward as it is pulled from hopper 110a by feed rollers 130a. If the tickets 210 of the folded ticket sheet 200 cling to each other as the ticket sheet is withdrawn, the perforations 220 are hooked against the top of the bars 400. Consequently, the charge removal bars 400 apply a frictional load to the ticket sheet thereby introducing a resistive force between the ticket sheet 200 and the bars 400 as the ticket sheet rubs along the bars. In addition, the bars 400 effectively remove static electricity charges on the ticket sheet 200.

FIG. 3 shows another modification of the hopper assembly of FIG. 1. In this embodiment, a fibrous material 500, for example mohair, is employed instead of the projection 300. The fibrous material 500 is attached to one side of the hopper 110a and to the surface of the feed guide 120a facing the hopper 110a. Each fiber 510 (FIG. 4) of the fibrous material 500 is attached to a backing strip 520 and faces the direction opposed to the direction shown by the arrow A in which the ticket sheet is conveyed toward the cutting roller 150. As in the case of the projection 300 and charge removal bars 400, the fibrous material 500 extends into the path of the ticket sheet 200 which causes the sheet to curve outward as it is pulled from hopper 110a by feed rollers 130a. If tickets 210 of the folded ticket sheet 200 clings to each other as the ticket sheet is drawn out, the perforations 220 are hooked against the tops of fibers 510. Therefore, the fibrous material applies a frictional load to the ticket sheet thereby introducing a resistive force between the ticket sheet 200 and the fibrous material 500 as the ticket sheet rubs along the fibers.

Figure 9:
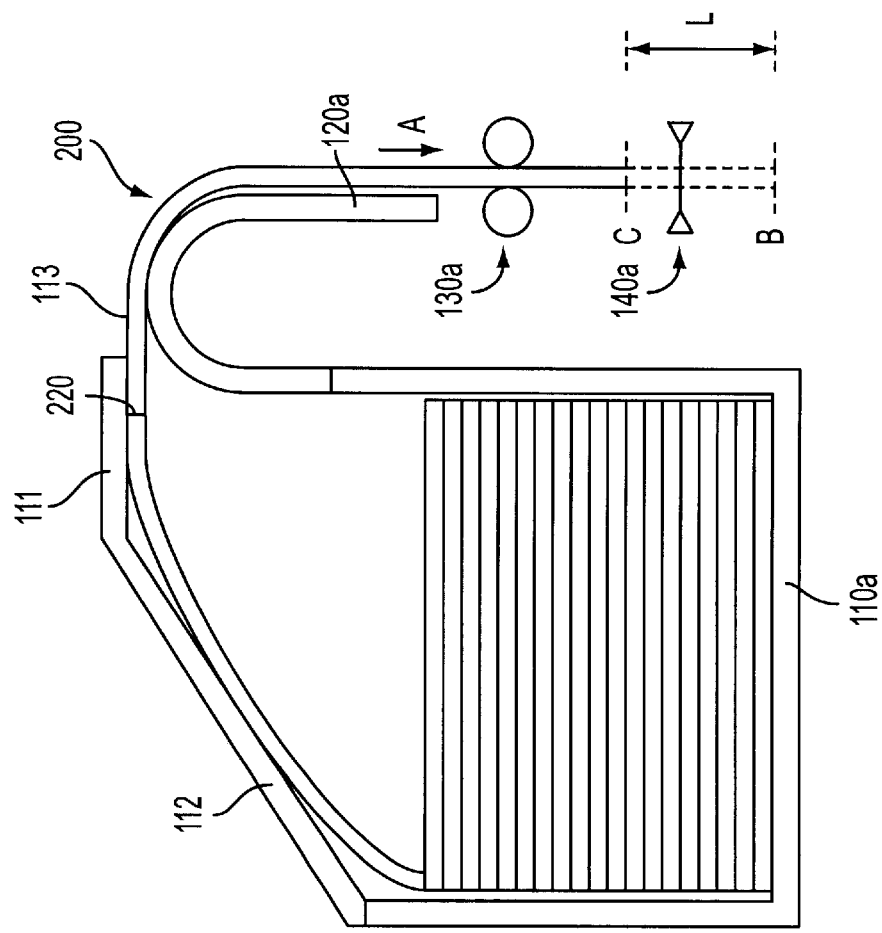

FIGS. 5 and 5A–5E illustrate a second embodiment of the invention wherein the hopper 110a is provided with a cover 111 as in the case of the prior art hopper of FIG. 9. However, in the invention of FIGS. 5–5E the cover 111 has a U-shaped part 600 which toward its center is concave in a direction facing the hopper 110a Consequently, the ticket sheet 200 is curved toward the hopper as it is drawn therefrom by the feed rollers 130a. As in the first embodiment of FIGS. 1–1D, a projection 300 is provided on the surface of the feed guide 120a.

The curvature of ticket sheet 200 toward the hopper in combination with the projection 300 introduces a frictional resistance between the ticket sheet 200 and the U-shaped part 600 as the sheet 200 is pulled from the hopper 110a along the part 600 by feed rollers 130a. The effect of the projection 600 is illustrated in FIGS. 5A–5E wherein the leading ticket of the ticket sheet 200 is labeled 210a, the next four tickets are labeled 210b, 210c, 210d and 210e, and the perforations between tickets 210a and 210b are designated 220a–b, between tickets 210b and 210c are designated 220b–c, between tickets 210c and 210d are designated 220c–d, and between tickets 210d and 210e are designated 220d–e.

Figure 5A:
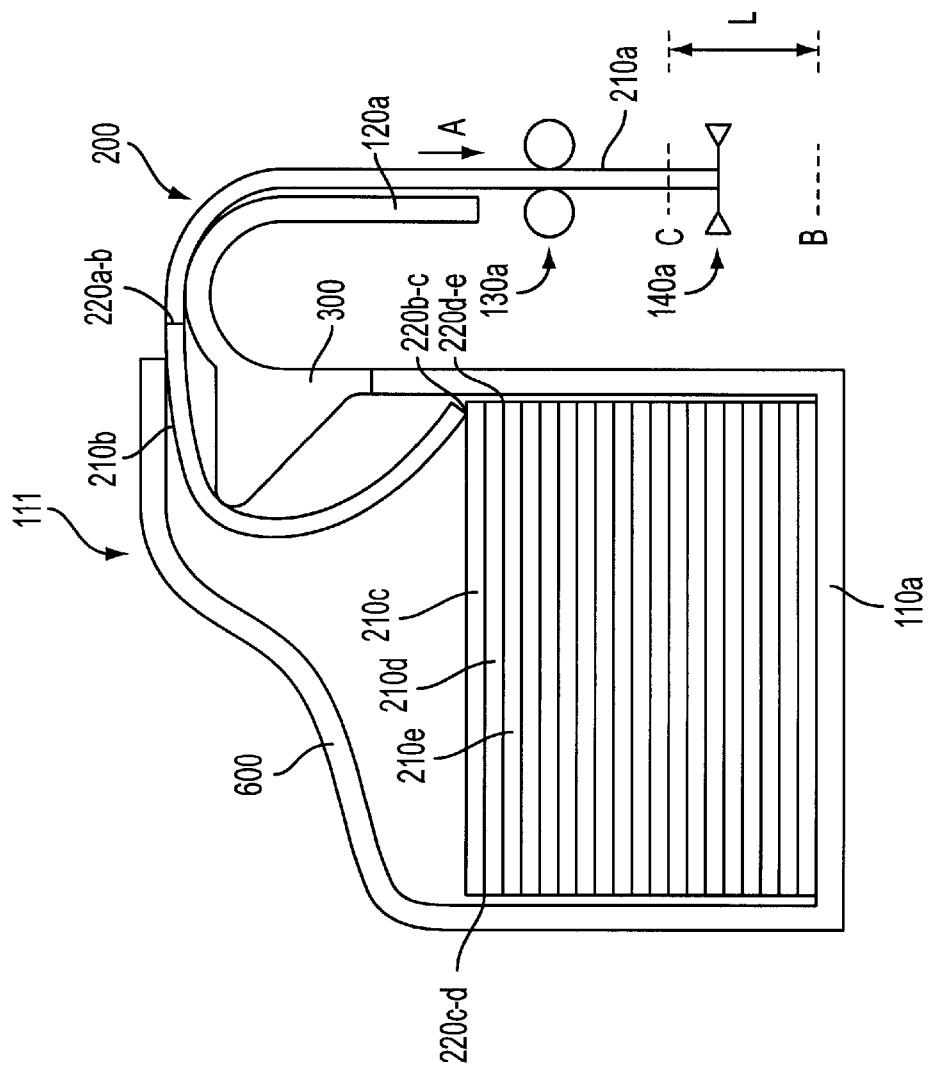
Figure 5B:
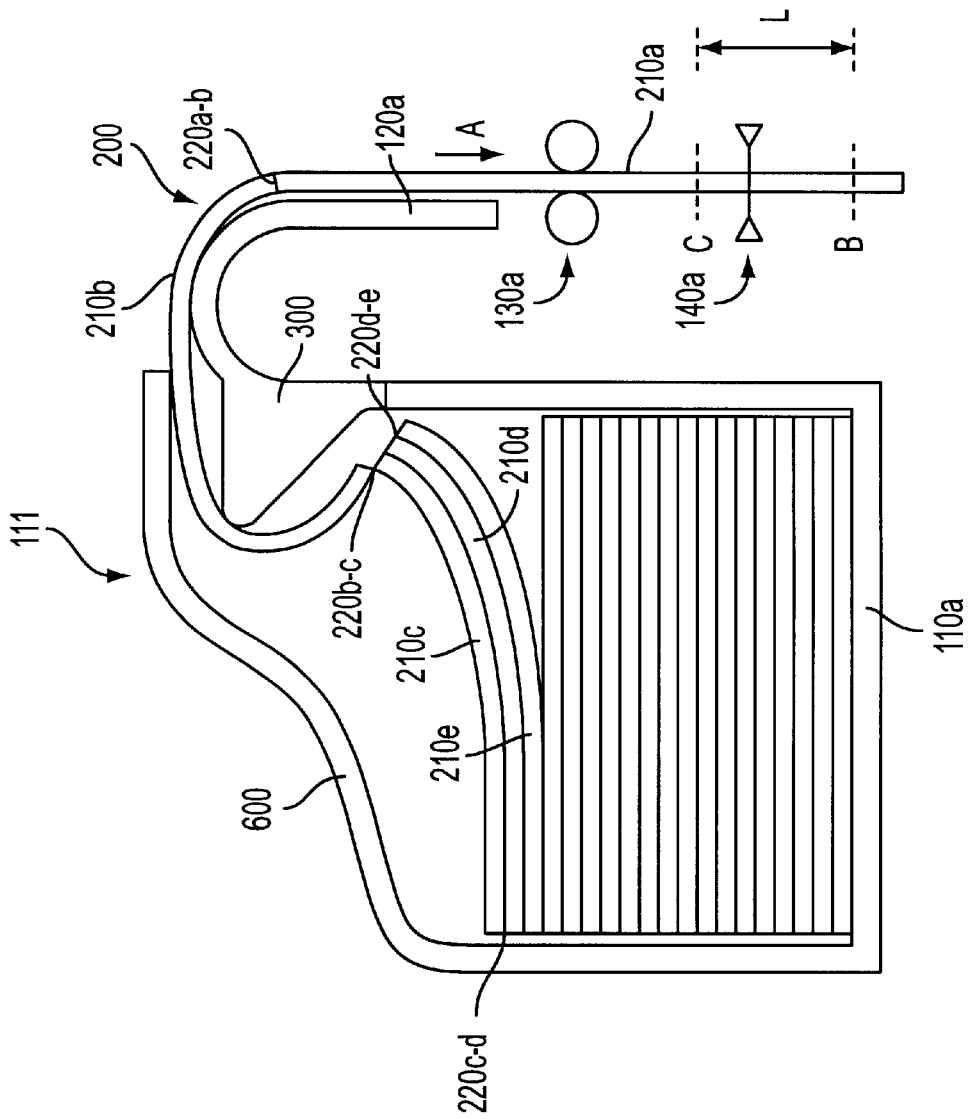
Figure 5C:
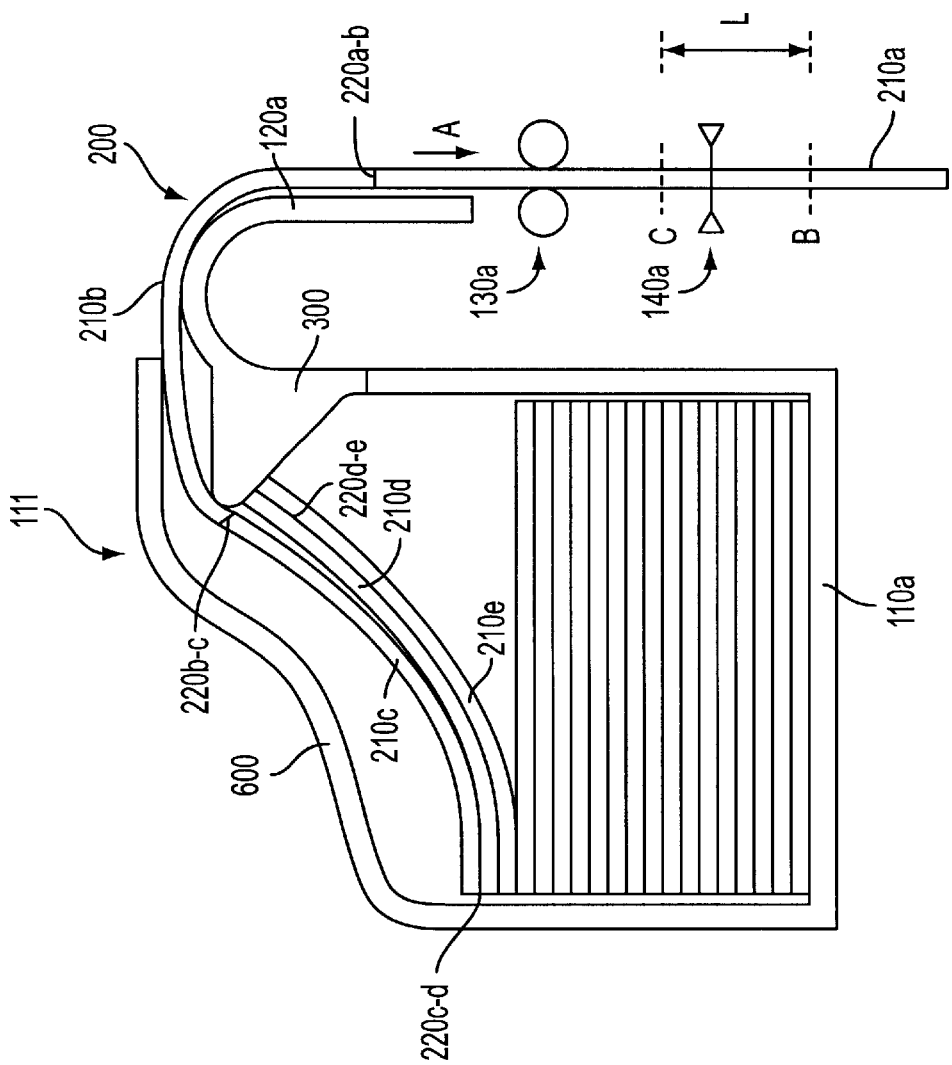
Figure 5D:
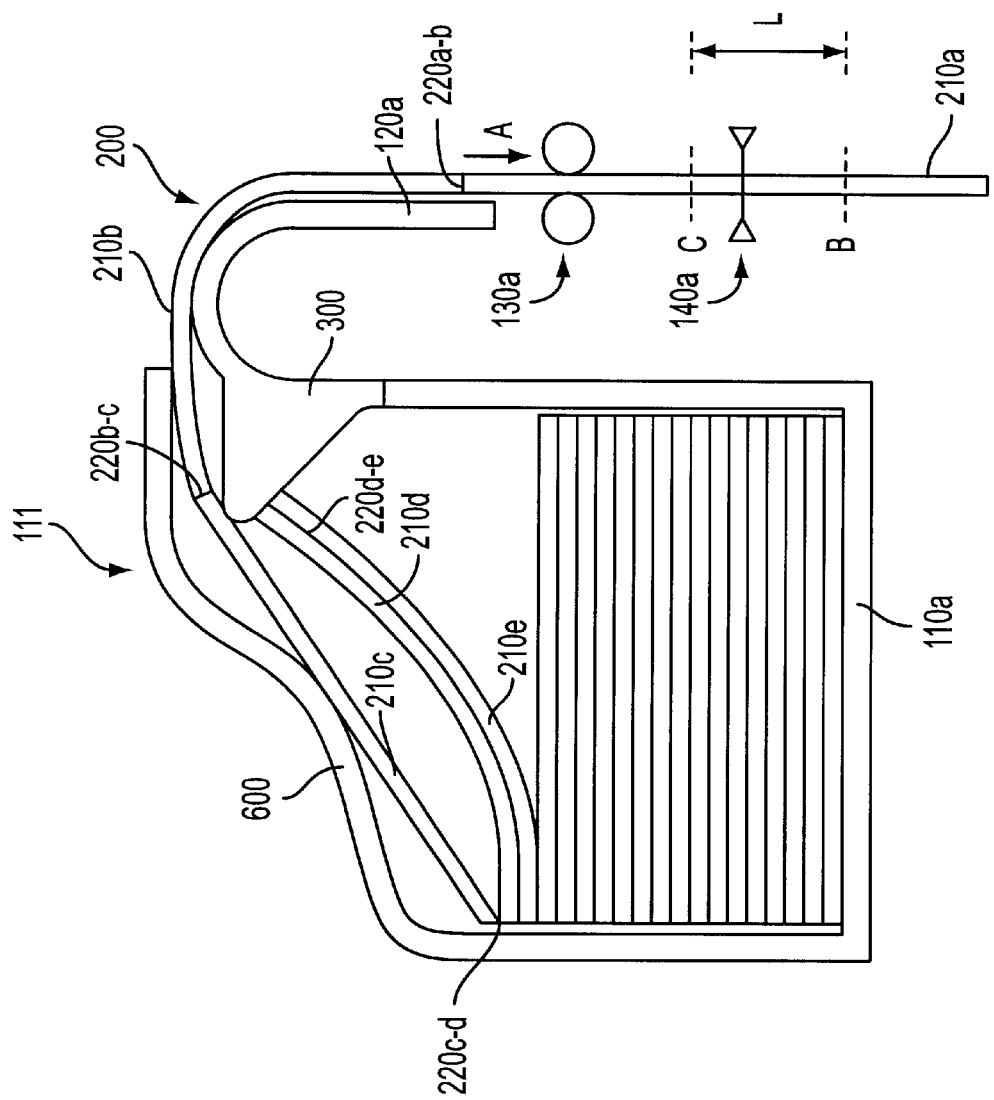

As indicated in FIG. 5A, when the leading edge of ticket 210a is being conveyed to the cutting roller 150 (FIG. 7), the subsequent ticket 210b is being fed along the projection 300, and the following tickets 210c–210e lie flat in the hopper 110a. Referring to FIG. 5B, the situation is shown in which, as the ticket sheet 200 is further withdrawn from the hopper 110a, ticket 210c adheres to ticket 210d due to an electrostatic charge on the tickets and/or because the ink on the tickets causes them to stick to each other. Consequently, the perforations 220d–e separating tickets 210d and 210c strike the projection 300 thereby restraining the ticket sheet 200 from moving forward in the direction of arrow A, as shown in FIG. 5C. As a result, as shown in FIG. 5D, ticket 210c is separated from ticket 210d and, as ticket sheet 200 is withdrawn from the hopper 110a, ticket 210c traverses a path which is tangent to U-shaped part 600 and the projection 300.

Referring to FIG. 5E, as the ticket sheet 200 is further withdrawn, the situation in which ticket 210d initially adheres to ticket 210e is shown. In this case, the ticket 210c is warped inward by the U-shaped part 600 causing the leading edge of ticket 210d to curl upward thereby separating it from ticket 210e.

FIGS. 6A and 6B show modifications of the hopper assembly of FIGS. 5–5E. The hopper assembly of FIG. 6A differs from the hopper assembly of FIGS. 5–5E in that it employs a roller 700 positioned between a position restraint part 112 (as shown in the prior art hopper assembly of FIG. 9) and the ticket sheet 200 thereby curving the ticket sheet toward the hopper 200. The hopper assembly of FIG. 6B is similar to the assembly of FIG. 6A except that a bearing 800 is substituted for the roller 700 of FIG. 6A. Thus, the embodiments of FIGS. 6A and 6B provide the same advantages as described for the embodiment of FIGS. 5–5E.

Referring to FIGS. 5–5E, 6A and 6B, the leading edge of the ticket sheet is fed over the feed guide 120a and between feed rollers 130a in the direction of the arrow A. When the leading edge of the ticket sheet 200 reaches the sensor 140a, the sensor generates a signal which causes the feed rollers 130a to continue to rotate for a predetermined period of time resulting in the leading edge of the ticket sheet reaching the point B downstream from the sensor 140a. Rotation of the feed rollers 130a is then stopped. Next, the feed rollers 130a are driven in reverse for another predetermined period of time which conveys the leading edge of the ticket sheet 200 from the location B through the distance L to a location C between the feed rollers 130a and the sensor 140a.

Although the leading edge of the ticket sheet 200 is conveyed to the cutting roller 150 by feed rollers 130a when a demand for issuing a ticket 210 is given to the apparatus 100, the ticket sheet 200 can be conveyed normally without the tickets thereof clinging to each other because a load is applied to the ticket sheet 200 by the projection 300. Further, in the embodiment of FIGS. 5–5E, when the ticket sheet 200 is conveyed in the direction opposing the arrow A, the ticket sheet 200 touches the U-shaped part 600 and is transformed into a U-shape. Therefore, the ticket sheet 200 is pushed back smoothly and not torn off at a line of perforations 220 because the ticket sheet 200 is conveyed along U-shaped part 600.

This arrangement is necessary regardless of which of the embodiments of this invention is employed because the apparatus 100 shown in FIG. 7 selects one of the two hoppers 110a and 110b according to the kind of ticket selected. Therefore, when the hopper, from which the ticket sheet is taken is switched to the other hopper, the leading edge of the ticket sheet 200 located at the cutting roller 150 after the ticket 210 has been issued must be returned to the location C between the feed rollers and the sensor. When instructions to issue a ticket 210 are input to the apparatus 100, the leading edge of the ticket sheet 200 is conveyed toward the cutting roller 150 by the feed rollers 130a.

As many apparently widely different embodiments of this invention may be made without departing from the spirit and scope thereof, it is to be understood that the invention is not limited to the specific embodiments thereof except as defined in the appended claims.

We claim:

1. A medium handling apparatus for conveying a continuous elongated medium formed of a plurality of sheets extending along a length of said medium, each of said sheets having a given width extending transverse to the length of the medium and being connected to a contiguous sheet by a line of perforations, comprising:

a hopper accommodating the medium and having a medium feeding area at a side thereof, the medium being folded along said lines of perforations and withdrawn from said hopper at said medium feeding area;

feed rollers for conveying the medium in a first direction, a feed guide having one end adjacent said hopper interposed between said hopper and said feed rollers, said feed guide guiding the medium as it travels from said hopper to said feed rollers; and a load member attached to the hopper and one end of said feed guide, said load member projecting into the medium feeding area of said hopper so as to continuously touch a surface of said medium and exert a resistive force thereon, the line of perforations between contiguous sheets of said medium striking said load member as said medium is conveyed to said feed rollers whereby said load member introduces said resistive force between said medium and said load member, said resistive force resting said medium and causing contiguous sheets of said medium to separate from each other.

2. A medium handling apparatus according to claim 1, wherein said load member is a projection, said projection having a width parallel to the lines of perforations.

3. A medium handling apparatus according to claim 2, wherein the width of said projection is at least one-half the width of said medium.

4. A medium handling apparatus according to claim 1, wherein said load member comprises a fibrous material, said fibrous material having individual fibers projecting at an acute angle from a backing material.

5. A medium handling apparatus according to claim 4, wherein each of the fibers of said fibrous material projects in a direction opposite said first direction.

6. A medium handling apparatus according to claim 4, wherein said fibers are composed of mohair.

7. A medium handling apparatus according to claim 1, wherein said load member is an electrostatic removing bar for removing static electricity.

8. A medium handling apparatus for conveying a continuous elongated medium formed of a plurality of sheets extending along a length of said medium, each of said sheets having a given width extending transverse to the length of the medium and being connected to a contiguous sheet by a line of perforations, comprising:

a hopper accommodating the medium and having a medium feeding area at a side thereof, the medium being folded along said lines of perforations and withdrawn from said hopper at said medium feeding area;

feed rollers for conveying the medium in a fist direction;

a feed guide having one end adjacent said hopper interposed between said hopper and said feed rollers, said feed guide guiding the medium as it travels from said hopper to said feed rollers;

a load member attached to the hopper and one end of said feed guide, said load member projecting into the medium feeding area of said hopper so as to continuously touch a surface of said medium and exert a resistive force thereon, the line of perforations between contiguous sheets of said medium striking said load member as said medium is conveyed to said feed rollers whereby said load member introduces said resistive force between said medium and said load member, said resistive force restraining said medium and causing contiguous sheets of said medium to separate from each other;

a sensor spaced in said first direction from said feed rollers, said sensor detecting the position of a leading edge of the medium and driving said feed rollers in one of said first direction and a second direction, said second direction being opposite said first direction; and a cover assembly attached to an upper portion of said hopper for producing a curve in the medium as the medium is drawn from said hopper by said feed rollers.

9. A medium handling apparatus according to claim 8, wherein the curve in said medium is produced by a cover of said cover assembly, said cover having a U-shape curve in the direction of said hopper.

10. A medium handling apparatus according to claim 8, wherein said cover assembly includes a roller interposed between a cover and the medium.

11. A medium handling apparatus according to claim 8, wherein said cover assembly includes a bearing interposed between a cover and the medium.

12. A medium handling apparatus according to claim 8, wherein said load member is a projection, said projection having a width parallel to the lines of perforations.

13. A medium handling apparatus according to claim 12, wherein the width of said projection is at least one-half the width of said medium.

14. A medium handling apparatus according to claim 8, wherein said load member comprises a fibrous material, said fibrous material having individual fibers projecting at an acute angle from a backing material.

15. A medium handling apparatus according to claim 14, wherein each of the fibers of said fibrous material projects in a direction opposite said first direction.

16. A medium handling apparatus according to claim 15, wherein said fibers are composed of mohair.

17. A medium handling apparatus according to claim 8, wherein said load member is an electrostatic removing bar for removing static electricity.

\* \* \* \* \*